(12) United States Patent
Elliott et al.

(10) Patent No.: US 8,668,240 B2
(45) Date of Patent: Mar. 11, 2014

(54) TAILGATE GAP COVER

(76) Inventors: Jordan Wesley Ranney Elliott, Bracebridge (CA); Kyle James Adie, Bracebridge (CA)

(*) Notice: Subject to any disclaimer, the term of this patent is extended or adjusted under 35 U.S.C. 154(b) by 0 days.

(21) Appl. No.: 13/411,791

(22) Filed: Mar. 5, 2012

(65) Prior Publication Data

US 2012/0222357 A1    Sep. 6, 2012

Related U.S. Application Data

(60) Provisional application No. 61/448,793, filed on Mar. 3, 2011.

(51) Int. Cl.
*B62D 33/03*    (2006.01)

(52) U.S. Cl.
USPC ........................................... 296/57.1

(58) Field of Classification Search
USPC ..................... 296/57.1, 106, 146.8
See application file for complete search history.

(56) References Cited

U.S. PATENT DOCUMENTS

| | | | | |
|---|---|---|---|---|
| 5,904,391 A | * | 5/1999 | Liljenquest et al. | 296/57.1 |
| 6,540,278 B2 | * | 4/2003 | Presley | 296/57.1 |

\* cited by examiner

*Primary Examiner* — Joseph Pape
(74) *Attorney, Agent, or Firm* — Gowling Lafleur Henderson LLP (57) ABSTRACT

Disclosed is a vehicle gap cover, such as a tailgate gap cover, for covering a gap defined between two moving components of the vehicle. In one embodiment, the gap cover is a tailgate gap cover for covering the tailgate gap defined between a truck bed and a gate of a truck. The tailgate gap cover includes a cover having a first edge portion, a second edge portion and an exposed portion therebetween. The first edge portion is connected to one of the gate and the truck bed while the second edge portion is slideably received at the other of the gate and the truck bed so that the exposed portion covers the tailgate gap.

19 Claims, 8 Drawing Sheets

TAILGATE GAP COVER

FIELD OF THE INVENTION

The present invention relates to trucks with beds and tailgates and to tailgate gap covers.

BACKGROUND OF THE INVENTION

Trucks and other vehicles, including trailers, commonly have compartments or truck beds in their back portion. The compartments can be used to hold and transport various materials or cargo such as gravel, dirt, tools, etc. These compartments are commonly lined with a protective liner. The compartments can be accessed through the use of a tailgate. A tailgate comprises a door or gate to the back compartment that is typically hinged at the bottom and back end of the back compartment.

When the tailgate door is opened a gap appears between the tailgate door and the bottom of the truck bed in the back portion of the vehicle. The gap typically reveals portions of the truck that are not protected by the protective liner. When materials or cargo are removed from the truck bed or placed into the truck bed, there is a risk that these materials or cargo can fall through the gap and cause damage to portions of the vehicle that are not protected by a liner. Additionally, materials or cargo can fall through or get caught in the gap making the vehicle difficult to clean or difficult to close. This problem also arises in other vehicles and trailers that use similar hinged type access doors, hatches and gates.

SUMMARY OF THE INVENTION

According to an aspect of the present invention, disclosed is a tailgate gap cover for covering the tailgate gap defined between a truck bed and a gate of a truck. The tailgate gap cover comprises a flexible sheet having a first edge portion, a second edge portion and an exposed portion therebetween. The first edge portion is attached to one of the gate and the truck bed and the second edge portion is slideably received at the other of the gate and the truck bed so that the exposed portion covers the tailgate gap.

BRIEF DESCRIPTION OF THE DRAWINGS

In order that the subject matter may be readily understood, embodiments are illustrated by way of examples in the accompanying drawings, in which.

DETAILED DESCRIPTION OF THE INVENTION

Trucks and other vehicles and trailers can have compartments or boxes in their back portions for transporting or holding cargo. Cargo can be sand, dirt, tools, furniture, equipment, bricks, etc. Other types of cargo will be familiar to skilled persons. A gap (i.e. a tailgate gap) exists between a gate of the compartment and the bed, or hold, of the compartment in a truck or vehicle when the gate is open.

Disclosed is a tailgate gap cover that maintains coverage over the tailgate gap when the gate is open. The cover comprises a flexible sheet of resilient plastic which is secured, along one edge, to one of the gate and the truck bed. The opposite edge is operable to slidably engage with the other of the gate and the truck bed allowing for coverage of the tailgate gap when the gate is open and/or closed.

It is understood that references to "truck" in the present document can include other vehicles and trailers. In trucks where the gate and truck bed include liners, the cover slides between the truck bed (i.e. the floor of the compartment of the truck or vehicle) and/or gate and a liner attached to the truck bed and/or gate.

Figure 1:
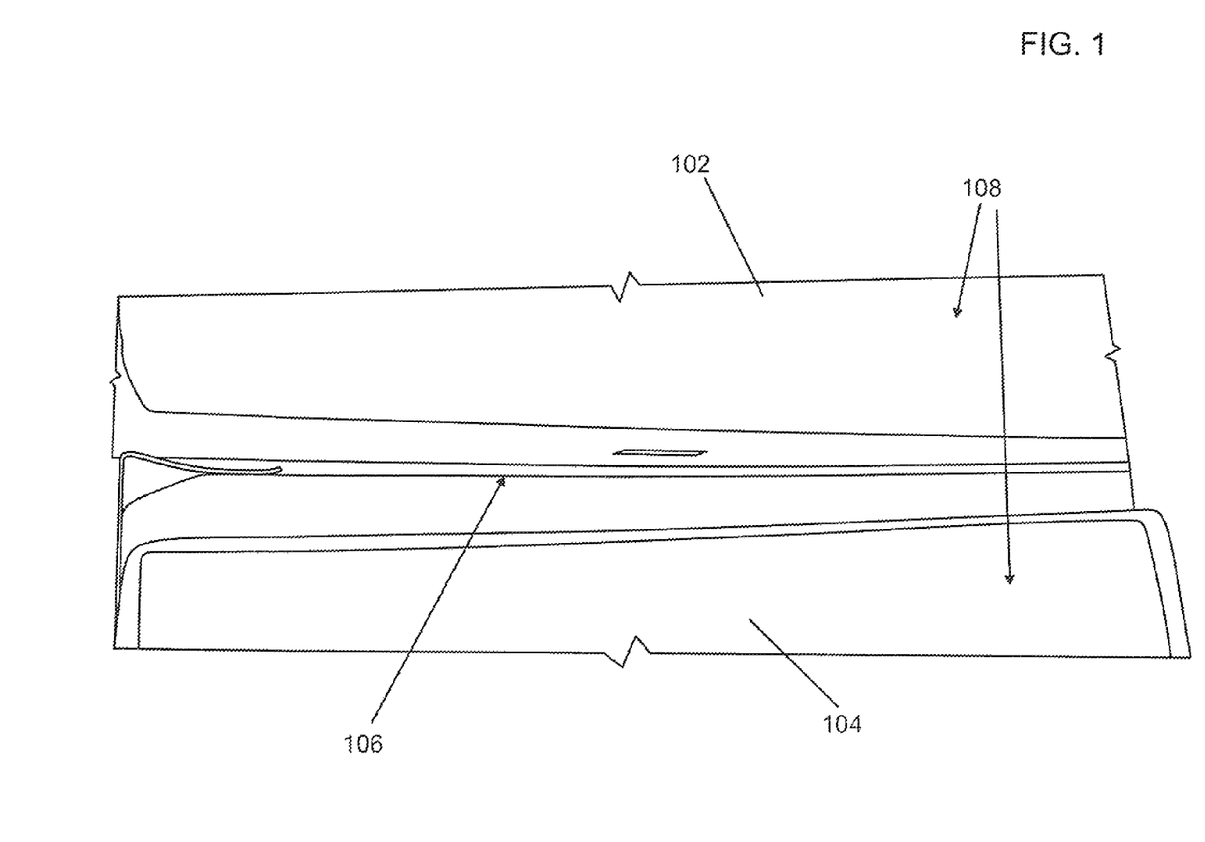
FIG. 1 is a photographs of a tailgate gap according to prior art.
Figure 7:
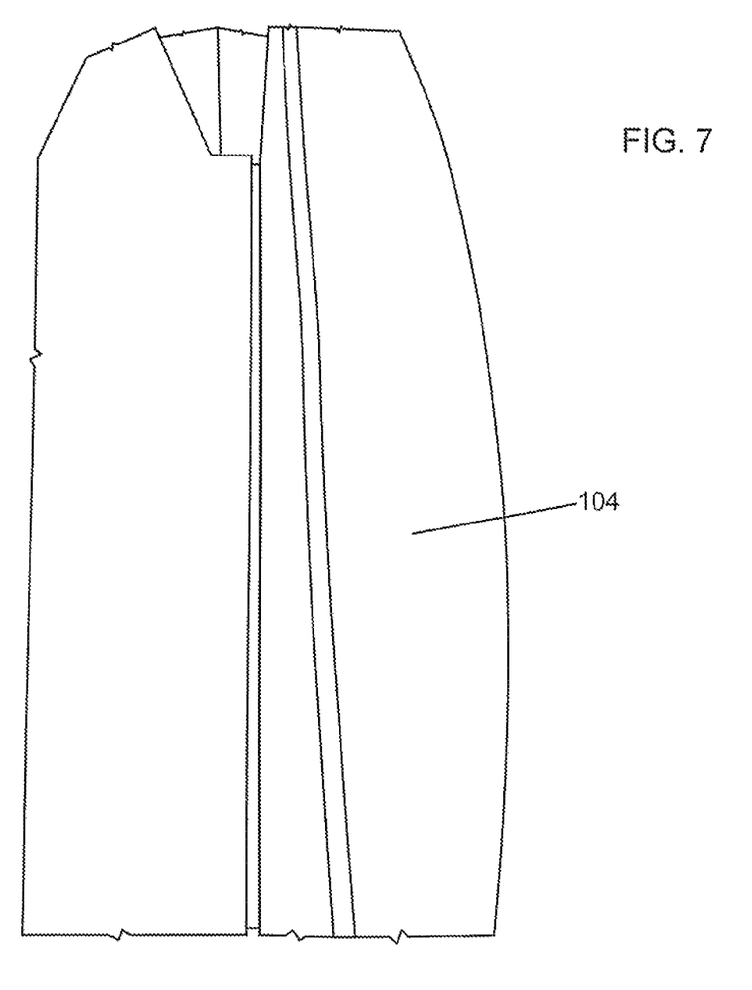
FIG. 7 is a photograph of the tailgate gap cover attached over the tailgate gap with the gate in the closed position.

Referring to the Figures, a tailgate gap 106 is defined between a truck bed 102 and a gate 104 of a truck. The gate 104 can move between an open position (as shown in FIG. 1) and a closed position (as shown in FIG. 7). When the gate 104 is in the closed position it is generally perpendicular to the truck bed 102 and defines a wall that, together with the remaining side walls of the truck bed 102, forms a perimeter around the truck bed 102.

According to the embodiment shown in the Figures, a liner 108 is attached onto each of the surface of the truck bed 102 and the surface of the gate 104 of the truck, i.e. each of the truck bed 102 and the gate 104 include a liner 108. The liner 108 can be made out of plastic, for example. Liner 108 can protect the truck, truck bed 102 and gate 104 from corrosion, damage, or rust. Liner 108 can be attached to the surface of the truck bed 102 and the truck gate 104 using fasteners, for example. The truck bed 102 can have a number of grooves running lengthwise in its surface and the liner 108 may have similar grooves that cooperate with the grooves in the surface of the truck bed 102.

When the liner 108 is attached over the truck bed 102, a space may be formed or defined between the bottom surface of the liner 108 and the upper surface of the truck bed 102 near the end of the truck bed 102 where the gate 104 is attached. Similarly, when the liner 108 is attached over the truck gate 104, a space may be formed or defined between the bottom surface of the liner 108 and the top surface of the gate 104. This space may only be defined near the end of the gate 104 where the gate 104 is attached to the truck bed 102. The space between the liner 108 and the truck bed 102 and the space between the liner 108 and the gate 104 can be less than one centimetre, for example.

The gate 104 is attached to the truck bed 102 or another portion of the back end of the truck. The attachment of the gate 104 to the truck is such that the gate 104 can rotate between an open position and a closed position. For example, the gate 104 can be attached to the truck via hinges or other rotatable components that allow the gate 104 to swivel or swing relative to the truck bed 102. There can be a locking mechanism for locking the gate 104 to the truck in a closed position.

Figure 2:
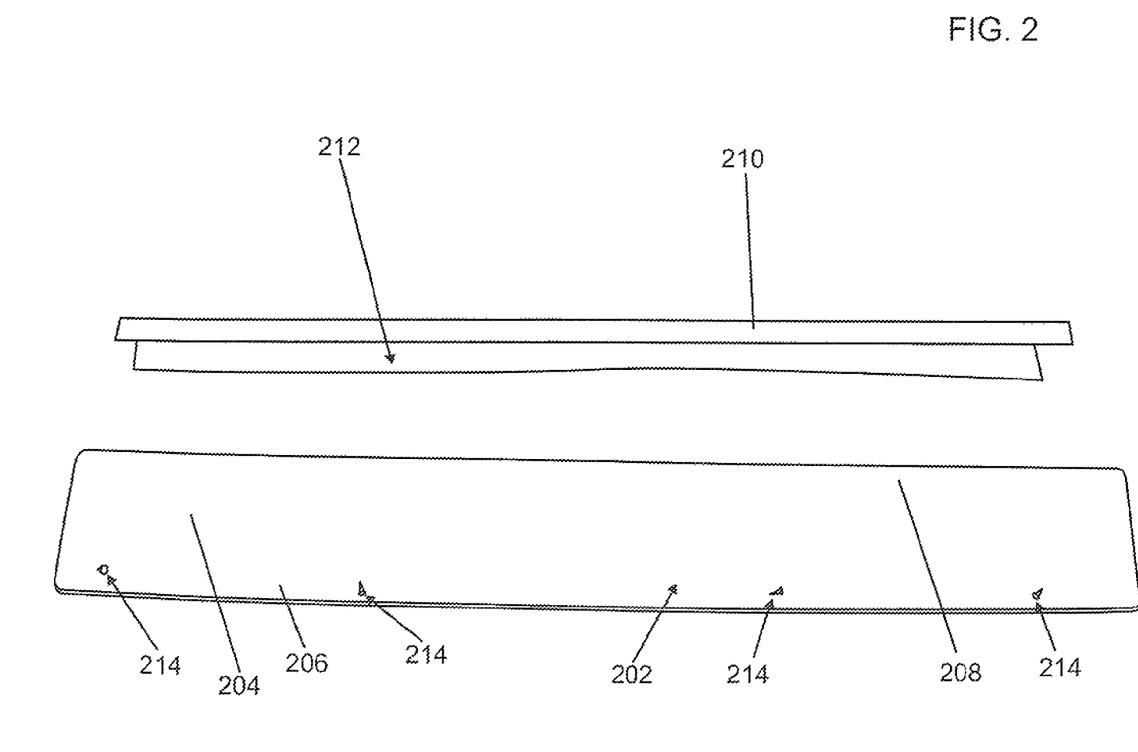
FIG. 2 is a photograph of a tailgate gap cover, a wear strip, adhesive tape and fasteners in accordance with an embodiment of the present invention.
Figure 3:
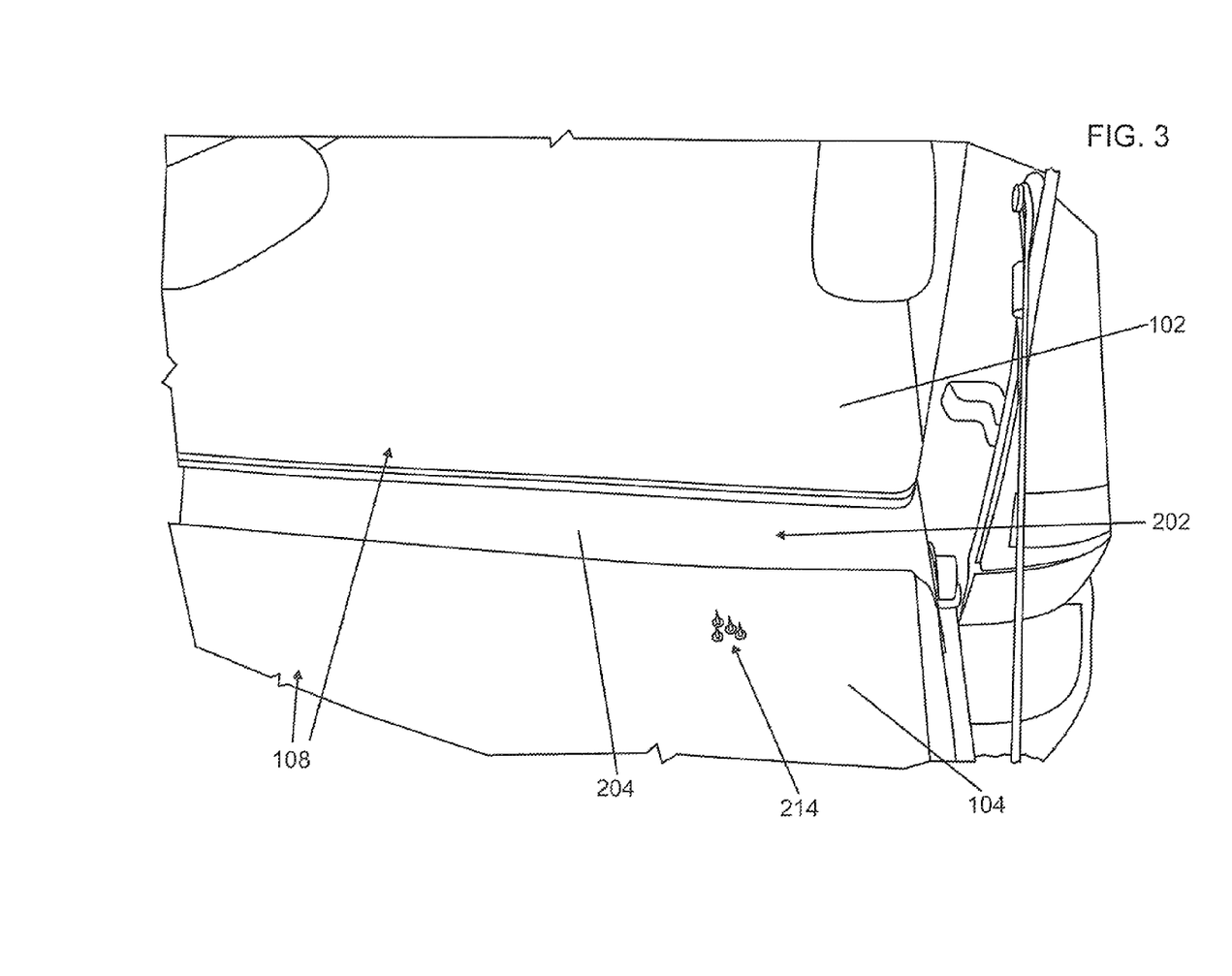
FIGS. 3 and 4 are each photographs of the tailgate gap cover covering the tailgate gap with the gate in an open position.

Turning to FIG. 2, one embodiment of the tailgate gap cover is shown comprising a flexible sheet 202 having a first edge portion 206, a second edge portion 208 and an exposed portion 204 therebetween. Fasteners 214 may be used for attaching the flexible sheet 202 to the truck or liner 108 as described in more detail below. The flexible sheet 202 can be made from plastic such as High Density Polyethylene or Ultra High Molecular Weight Polyethylene. Preferably the flexible sheet 202 is made from a resilient plastic that can bend about 90 degrees without snapping or breaking. Preferably the flexible sheet 202 is made from a material that is weather resistant and that is not easily damaged from exposure to weather. FIG. 2 also shows a wear strip 210 and a length of double sided adhesive tape 212, which will be discussed in further detail below.

Figure 4:
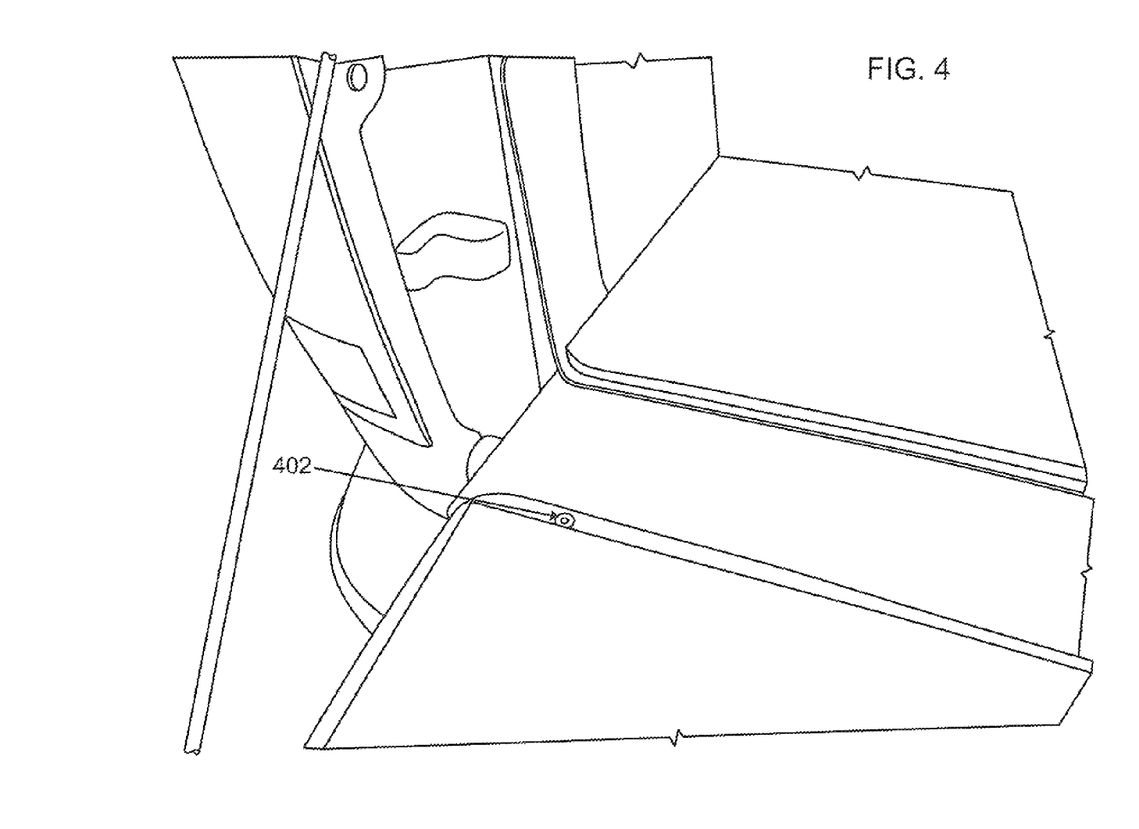
Figure 5:
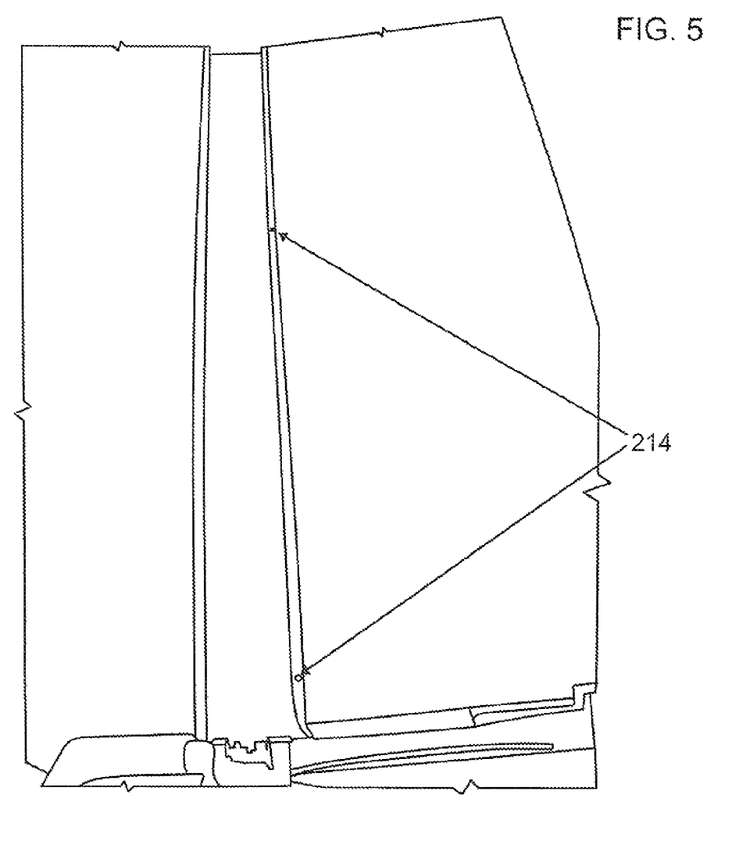
FIG. 5 is a photograph of the tailgate gap cover attached over the gap with the gate in the open position.

According to the embodiment shown in the Figures, the first edge portion 206 is attached to the gate 104. For example, one or more fasteners 214 may be used to attach the first edge portion 206 to the liner 108 that is attached to the gate 104. With reference to FIG. 4, screw holes 402 pass through a portion of the liner 108 covering the gate 104 to allow the first edge portion 206 to be secured to the gate 104 using fasteners 214. FIG. 5 shows fasteners 214 attaching the first edge portion 206 to the liner 108 covering the gate 104. However, it will be understood that the flexible sheet 202 may be attached to the truck bed 102 or the gate 104 using fasteners already located on the truck.

With reference to the embodiment shown in the Figures, the second edge portion 208 of the flexible sheet 202 is slideably received on the truck bed 102 so that the exposed portion 204 blocks or covers the tailgate gap 106. The second edge portion 208 is sized to fit in the space between the liner 108 and the truck bed 102 and can slide within that space.

According to alternative embodiments, instead of using fasteners 214, the first edge portion 206 can be attached or secured to the gate 104 using the double sided adhesive tape 212 or using other attachment means familiar to a person skilled in the art. For example, the double sided adhesive tape 212 may be attached along the length of the first edge portion 206 and along either the length of the liner 108 covering the gate 104 or the gate 104 itself.

According to other embodiments, the first edge portion 206 can be attached to the truck bed 102 instead of the gate 104. For example, the first edge portion 206 can be attached to the liner 108 on the truck bed 102. The attachment of the first edge portion 206 to the truck bed 102 can be similar to the attachment of the first edge portion 206 to the gate 104 described above, for example. When the first edge portion 206 is attached to the truck bed 102, the second edge portion 208 is slideably received at the gate 104. For example, the second edge portion 208 can fit in the space between the bottom surface of the liner 108 and the top surface of the gate 104 so as to slide therebetween.

Figure 6:
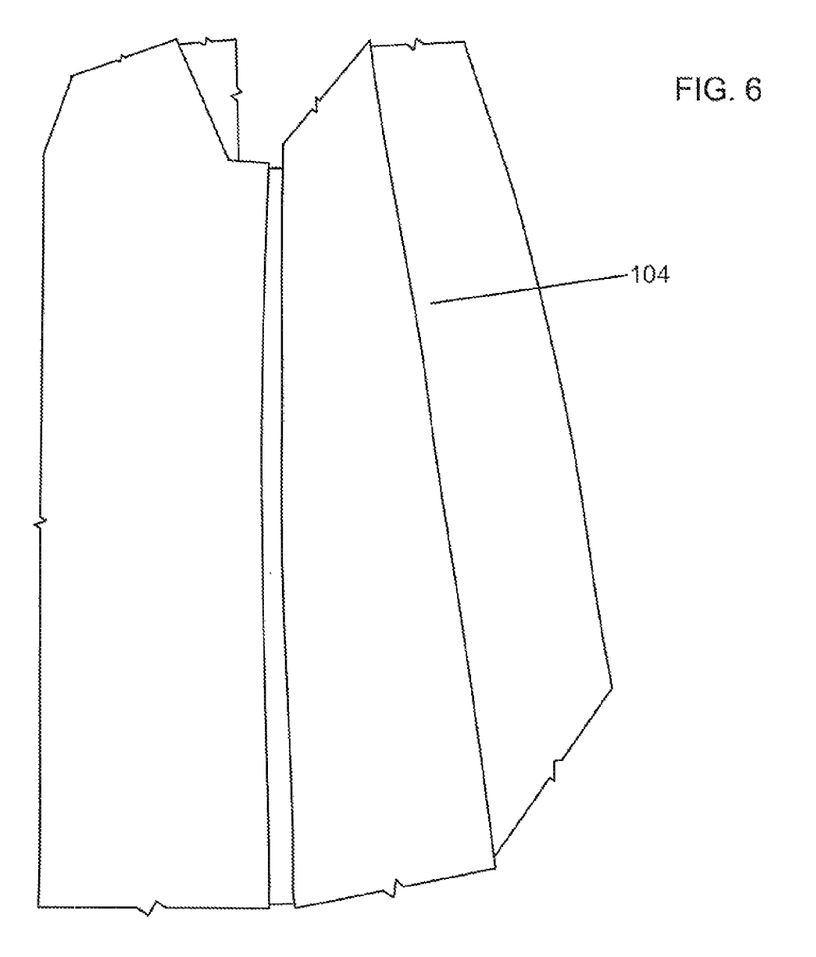
FIG. 6 is a photograph of the tailgate gap cover attached over the gap with the gate between the open position and a closed position.

FIGS. 5 to 7 show the gate 104 moving between an open position (FIG. 5) and a closed position (FIG. 7). While the gate 104 is closing (i.e. rotating towards the generally perpendicular position relative to the truck bed 102 to enclose the truck bed 102), the flexible sheet 202 slides within the space between the liner 108 and the truck bed 102 thereby maintaining coverage over the tailgate gap 106 (i.e. such that the exposed portion 204 covers the gap 106). Further, while the gate 104 is closing or opening, the flexible sheet 202 bends so as to maintain coverage over the tailgate gap 106. Similarly, while the gate is opening (i.e. rotating towards a generally parallel position relative to the truck bed 102), the flexible sheet 202 slides within the space between the liner 108 and the truck bed 102 thereby maintaining the flexible sheet 202 such that the exposed portion 204 covers the tailgate gap 106.

According to a further embodiment, the wear strip 210 attaches to edge of the flexible sheet 202 that is slidably received on the truck bed 102 or gate 104. The wear strip 210 protects the truck and paint on the truck from damage as a result of the sliding movement of the flexible sheet 202 within the space between the liner 108 and the truck bed 102 or truck gate 104 or the space within the opening on a connection element 802, which is described further below. Alternatively, the wear strip 210 can attach to the portion of the truck that comes into contact with the flexible sheet 202. This wear strip 210 then acts as a barrier between the flexible sheet 202 and the truck so as to protect the truck from the sliding motion of the flexible sheet 202. The wear strip 210 can be attached to the flexible sheet 202 or to the truck using an adhesive, for example.

Figure 8:
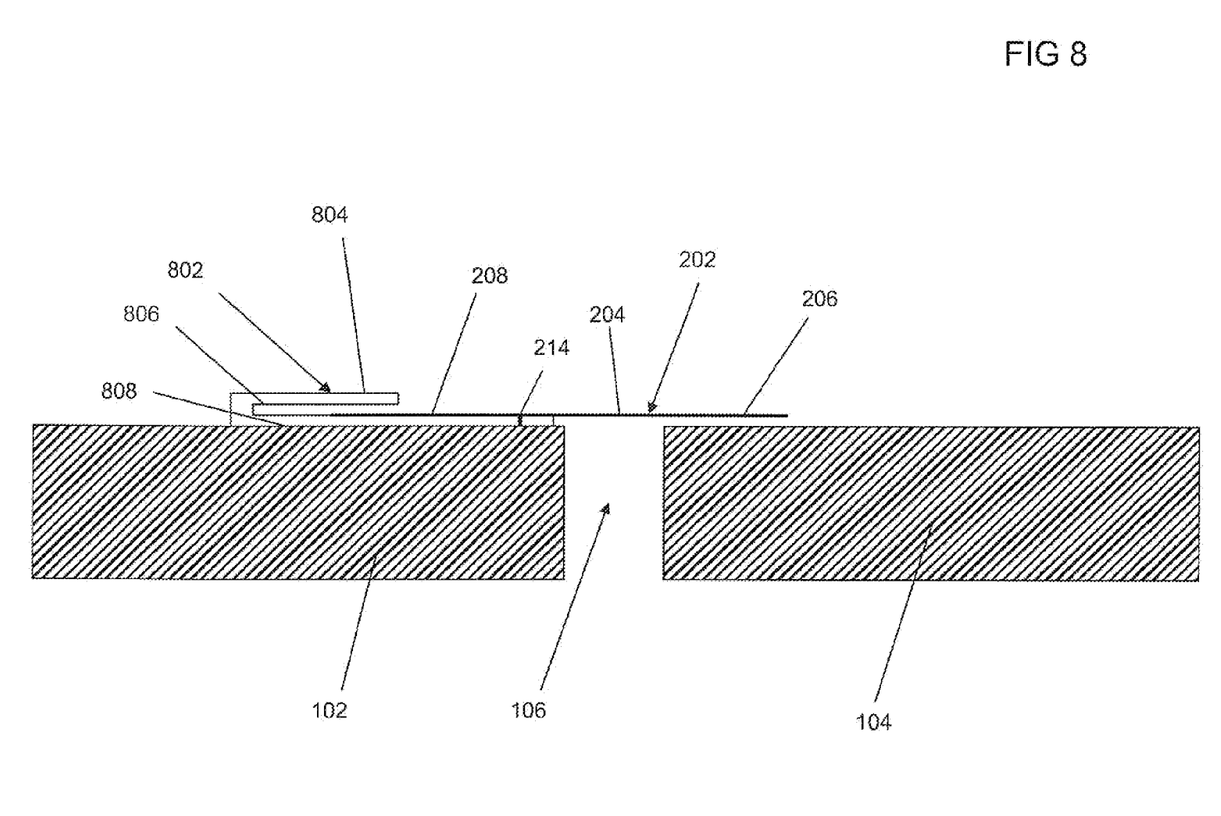
FIG. 8 is a schematic diagram of a connection element attached to the truck bed and with the tailgate gap cover attached over the tailgate gap.

Referring to FIG. 8. in another embodiment, the tailgate gap cover further comprises a connection element 802 that has a top portion 804 and a bottom portion 808 defining an opening 806 therebetween. The bottom portion 808 of the connection element 802 is attached to the truck bed 102 and the second edge portion 208 of the flexible sheet 202 can be slidably received within the opening 806. The connection element 802 is positioned on the truck bed so that when the second edge portion 208 is received in the opening 806 the exposed portion 204 of the flexible sheet 202 covers the gap 106. The first edge portion 206 of the flexible sheet 202 is attached to the gate 104 so that when the gate 104 is opening or closing the second edge portion 208 slides within the opening 806 of the connection element thereby maintaining the flexible sheet 202 such that the exposed portion 204 covers the tailgate gap 106. Alternatively, the connection element 802 may be attached to the gate 104 and the first edge portion 206 of the flexible sheet 202 is attached to the truck bed 102. The attachment of the connection element 802 to the truck bed 102 or gate 104 may be made by any means, such as screws or adhesive. In one embodiment the bottom portion 808 extends beyond the length of the top portion 804 to allow for easier attachment of the bottom portion 808, for example using fasteners 214, to the truck bed 102 or gate 104, as seen in FIG. 8. The connection element 802 is preferably made from material that will not easily deform so as to withstand the weight of any load placed in the truck bed 102 when the connection element 802 is located therein.

According to a further embodiment, the present invention can be sold as a kit. The kit can comprise the flexible sheet 202 having a first edge portion 206 and a second edge portion 208 and an exposed portion 204 located between the first edge portion 206 and the second edge portion 208. The kit may also comprise at least one fastener 214 and instructions for attaching the first edge portion 206 to one of the gate 104 of a truck and the truck bed 102 using the at least one fastener 214 so that the second edge portion 208 is slideably received at the other of the gate 104 and the truck bed 102. As a result of the sliding engagement of the second edge portion 208 with one of the gate 104 and the truck bed 102, the exposed portion 204 covers the tailgate gap 106 defined between the gate 104 and truck bed 102.

It will be understood that while the embodiment described herein relates to a specific use on tailgate, the cover described herein is not limited to that use. For example, the cover may be used in a vehicle, such as a car, that has a tailgate hatch, or trunk lid, where operating the hatch or lid, forms a gap into which items, such as snow, may fall. The cover, described herein, may be connected to the vehicle so that as the hatch, lid or door is opened, the cover, which is connected to both parts of the hatch, lid or door, extends to cover the gap, thereby preventing anything from falling into the gap, such as snow on a snow covered car.

One or more currently preferred embodiments have been described by way of example. It will be apparent to persons skilled in the art that a number of variations and modifications can be made without departing from the scope of the invention as defined in the claims.

What is claimed is:

1. A tailgate gap cover for covering a tailgate gap defined between a truck bed and a gate of a truck in an open position, the truck bed having an upper surface and the gate having a top surface facing in the truck bed when the gate is in a closed position. the tailgate gap cover comprising:
a flexible sheet having a first edge portion, a second edge portion and an exposed portion therebetween, the first edge portion attached to one of the top surface of the gate and the upper surface of the truck bed, the flexible sheet extending over the tailgate gap and along a portion of the other of the top surface of the gate and the upper surface of the truck bed so that the exposed portion covers the tailgate gap, the second edge portion unfastened to the other of the top surface and the upper surface, the flexible sheet bending and the second edge portion sliding along the other of the top surface and the upper surface in response to a movement of the gate between the open and closed positions.

2. The tailgate gap cover of claim 1, wherein the first edge portion is attached to the upper surface of the truck bed and wherein the gate is covered in a gate liner such that the second edge portion of the flexible sheet is slideably received at the gate between a bottom surface of the gate liner and the top surface of the gate.

3. The tailgate gap cover of claim 1 wherein the first edge portion is attached to the upper surface of the truck bed and wherein the tailgate gap cover further comprises a connection element having a top portion and a bottom portion defining a sandwich area therebetween, the connection element connected to the gate for slideably receiving the second edge portion in the sandwich area.

4. The tailgate gap cover of claim 1, further comprising a wear strip connected to the second edge portion of the flexible sheet to protect the other of the top surface and upper surface along which the second edge portion slides.

5. The tailgate gap cover of claim 1, wherein the first edge portion is attached to one of the top surface, of the truck bed or the upper surface of the gate using at least one fastener.

6. The tailgate gap cover of claim 2 wherein the truck bed is covered in a truck bed liner and wherein the first edge portion is further attached to the truck bed liner.

7. The tailgate gap cover of claim 1, wherein the first edge portion is attached to the top surface of the gate and wherein the truck bed is covered in a truck bed liner such that the second edge portion of the flexible sheet is slideably received at the truck bed between a bottom surface of the truck bed liner and the upper surface of the truck bed.

8. The tailgate gap cover of claim 1 wherein the first edge portion is attached to the top surface of the gate and wherein the tailgate gap cover further comprises a connection element having a top portion and a bottom portion defining a sandwich area therebetween, the connection element connected to the truck bed for slideably receiving the second edge portion in the sandwich area.

9. The tailgate gap cover of claim 7 wherein the gate is covered in a gate liner and wherein the first edge portion is further attached to the gate liner.

10. The tailgate gap cover of claim 1 wherein the flexible sheet is constructed of a plastic material.

11. A tailgate gap cover kit for covering a tailgate gap defined between a truck bed and a gate of a truck in an open position, the truck bed having an upper surface and the gate having a top surface facing into the truck bed when the gate is in a closed position, the kit comprising:
a flexible sheet having a first edge portion, a second edge portion and an exposed portion therebetween, the flexible sheet being bendable in the presence of a bending stress and self-returnable to a substantially planar position in the absence of the bending stress, the first edge portion attachable to one of a top surface of the gate and an upper surface of the truck bed using at least one fastener so that the flexible sheet extends over the tailgate gap and along a portion of the other of the top surface of the gate and an upper surface of the truck bed with the exposed portion covering the tailgate gap and the second edge portion remaining unfastened to the other of the top surface and the upper surface, the flexible sheet bendable and the second edge portion slidable along the other of the top surface and the upper surface in response to a movement of the gate between the open and closed positions:
at least one fastener; and
instructions for attaching the flexible sheet and fastener.

12. The kit of claim 11 further comprising a wear strip for adhesive attachment to the second edge portion of the flexible sheet and wherein the instructions further comprise instructions for attaching the wear strip to the flexible sheet.

13. The kit of any one of claim 11 or 12 further comprising a connection element having a top portion and a bottom portion defining a sandwich area therebetween, the instructions further comprising instructions for attaching the connection element to the other of the top surface and the upper surface for slideably receiving the second edge portion of the flexible sheet.

14. The kit of claim 11, wherein the truck bed is covered in a truck bed liner and wherein the first edge portion is attachable to the top surface of the gate and the second edge portion is positionable for sliding between a bottom surface of the truck bed liner and the upper surface of the truck bed.

15. The kit of claim 11, wherein the gate is covered in a gate liner and wherein the first edge portion is attachable to the upper surface of the truck bed and the second edge portion is positionable for sliding between a bottom surface of the gate liner and the top surface of the gate.

16. The kit of claim 11 wherein the flexible sheet is constructed of a plastic material.

17. A tailgate gap cover for covering a tailgate gap defined between a truck bed and a gate of a truck in an open position, the truck bed having an upper surface covered by a truck bed liner and the gate having a top surface covered by a gate liner, the top surface facing into the truck bed when the gate is in a closed position, the tailgate gap cover comprising:
a flexible sheet having a first edge portion, a second edge portion and an exposed portion therebetween, the first edge portion attached to one of:
the top surface of the gate under the gate liner; and
the upper surface of the truck bed under the truck bed liner,
wherein the flexible sheet extends over the gap, so that the exposed portion covers the gap, and along a portion of the other of the top surface of the gate under the gate liner and the upper surface of the truck bed under the truck bed liner where the second edge portion is received for sliding: and,
wherein the flexible sheet bends and the second edge portion slides in response to a movement of the gate between the open and closed positions.

18. The tailgate gap cover of claim 17 wherein when the first edge portion is attached to the top surface, the first edge portion is attached using one or more fasteners that attached the gate liner to the top surface and wherein when the first edge portion is attached to the upper surface, the first edge portion is attached using one or more fasteners that attached the truck bed liner to the upper surface.

19. The tailgate gap cover of claim 17 wherein the flexible sheet is constructed of a plastic material.

\* \* \* \* \*